United States Patent

Strasser et al.

[11] Patent Number: 6,062,569
[45] Date of Patent: May 16, 2000

[54] FIBER REINFORCED CERAMIC MATRIX COMPOSITE PISTON RING

[75] Inventors: Thomas Edward Strasser, Corona; Steven Donald Atmur, Riverside, both of Calif.

[73] Assignee: Northrop Grumman Corporation, Los Angeles, Calif.

[21] Appl. No.: 08/989,283

[22] Filed: Dec. 12, 1997

[51] Int. Cl.[7] .................................. F16J 9/12; F16J 9/20; F16J 9/26
[52] U.S. Cl. ........................... 277/434; 277/937; 277/943
[58] Field of Search .................................. 277/434, 936, 277/937, 943, 535, 536, 537, 441, 440

[56] References Cited

U.S. PATENT DOCUMENTS

| | | | |
|---|---|---|---|
| 2,591,920 | 4/1952 | Colvin | 277/434 |
| 3,560,006 | 2/1971 | Wantanabe . | |
| 3,561,087 | 2/1971 | Koehler | 277/434 X |
| 3,608,911 | 9/1971 | Prasse et al. . | |
| 3,727,927 | 4/1973 | Packard | 277/434 |
| 3,814,447 | 6/1974 | Prasse et al. . | |
| 3,921,985 | 11/1975 | Fimml | 277/434 X |
| 4,307,890 | 12/1981 | Naruse . | |
| 4,522,415 | 6/1985 | Dworak | 277/434 |
| 4,570,946 | 2/1986 | Tsuhiya et al. . | |
| 4,704,332 | 11/1987 | Brennan et al. | 428/428 |
| 5,154,433 | 10/1992 | Naruse . | |
| 5,638,779 | 6/1997 | Atmur et al. | 123/65 BA |
| 5,660,399 | 8/1997 | Atmur et al. | 277/440 |
| 5,794,943 | 8/1998 | Atmur et al. | 277/441 |
| 5,816,211 | 10/1998 | Atmur et al. | 123/193.4 |

*Primary Examiner*—Anthony Knight
*Attorney, Agent, or Firm*—Terry J. Anderson; Karl J. Hoch, Jr.

[57] ABSTRACT

A heat-resistant, thermally stable, ductile piston ring for an internal combustion engine having a structure comprised at least partially of fiber reinforced ceramic matrix composite (FRCMC) material. The FRCMC material includes a polymer-derived ceramic resin in its ceramic state and fibers. The ceramic portion of the material for the most part provides the heat-resistance of the FRCMC material, while the fibers produce a desired degree of ductility in the FRCMC material. Filler materials may incorporated into the piston ring to produce the desired degree of hardness and/or coefficient of friction.

17 Claims, 1 Drawing Sheet

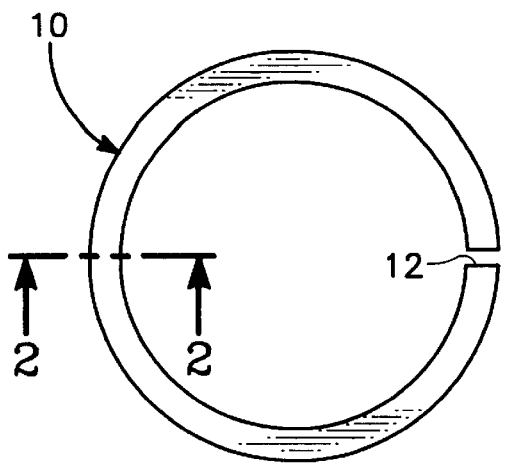
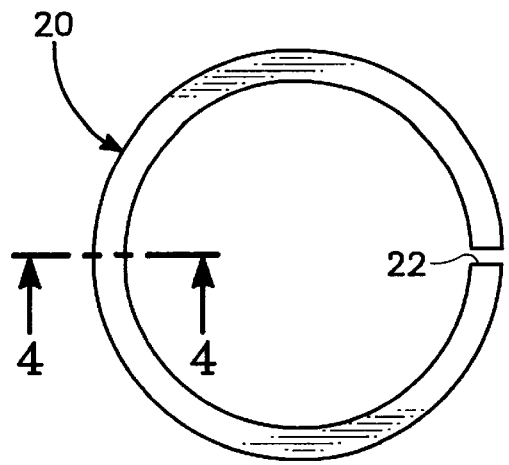
FIG. 1  FIG. 3
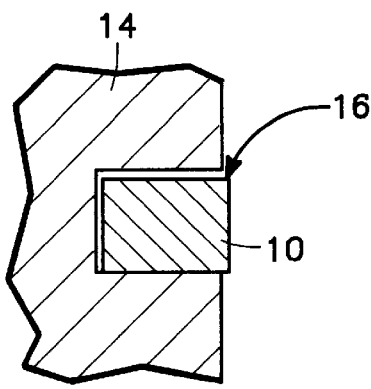
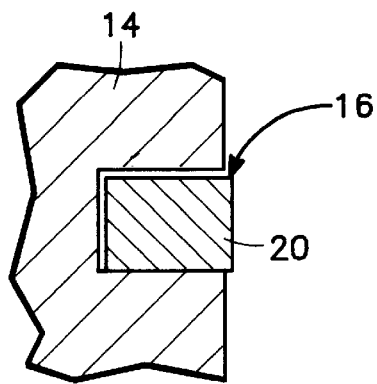
FIG. 2  FIG. 4
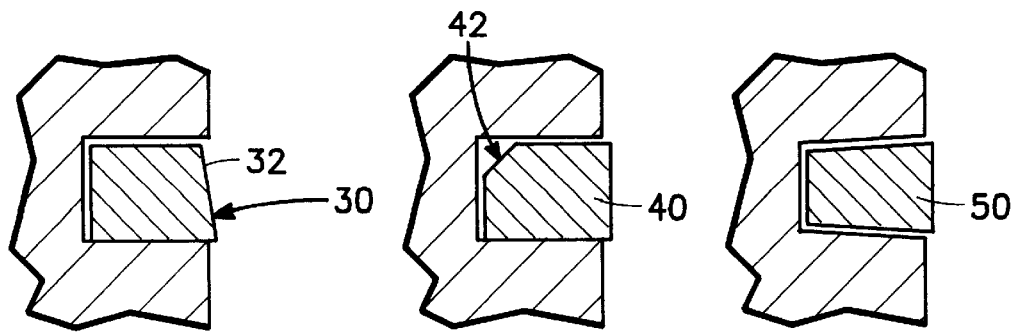
FIG. 5  FIG. 6  FIG. 7

FIBER REINFORCED CERAMIC MATRIX COMPOSITE PISTON RING

BACKGROUND OF THE INVENTION

1. Technical Field

This invention relates to a piston ring for an internal combustion engine, and more particularly, to such a piston ring formed of a fiber reinforced ceramic matrix composite (FRCMC) material and methods for making it.

2. Background Art

In the basic operation of a gasoline-powered internal combustion engine, a piston moving up and down within a cylinder draws in a combustible mixture of fuel and air on its down-stroke and compresses it on its up-stroke. The compressed mixture is then ignited and burns and expands driving the piston down. A similar process occurs in other types of engines. Piston rings are designed primarily to seal the combustion chamber area of the cylinder. If the piston is not properly sealed within the cylinder, blow-by occurs and the compression of the combustible mixture is reduced or non-existent thereby reducing or eliminating the effectiveness of that piston/cylinder within the engine. Additionally, on combustion of the mixture, piston rings prevent blow-by of the expanding gasses between the piston and the wall of the cylinder. Piston rings are installed near the top of the piston. The ring must exert even pressure against the cylinder wall for the full circumference of the cylinder wall to prevent blow-by and ensure engine efficiency. Therefore, piston rings are designed so that the diameter before installation is slightly larger than that of the cylinder bore. As a result, piston rings are exposed to great stresses during the process of mounting them on the piston head and tend to fracture during the installation process. The piston and piston rings are exposed to high pressures and high pressure variations, Additionally, the piston rings are exposed to frictional heating as well as heating due to the combustion of the fuel mixture. Hence, they are exposed to high temperatures and temperature variations, making them prone to thermally-induced failure. While the principles of the present invention are applicable to a wide variety of engine types, a standard cylindrical piston moving up and down within a cylindrical cylinder of an engine block having one or more cylinders will be used as the embodiment chosen for description hereinafter and in the drawings which accompany it. It should be understood, however, that it is intended that the invention described and claimed herein be accorded a breadth in keeping with the scope and spirit of the disclosure as applied to all engine types.

In a classic engine, the cylinders and pistons are made of metal. Cast iron is the conventional material used for piston rings, though aluminum, steel and other materials are used. Conventional piston rings are often chrome plated or molybdenum coated or coated with other materials to provide increased life and greater freedom from scoring.

As stated previously, the standard method of sealing the space between the cylinder walls and the piston is the piston ring. A space exists (and must exist) between the piston and the cylinder because of the dissimilar thermal expansion of the metal components. If the piston and cylinder were sized exactly with only enough clearance for the piston to fit within the cylinder with a coating of lubricating oil film between them, as soon as the metal heated from the combustion within the cylinders and expanded, the piston would seize within the cylinder. If enough clearance was provided initially to allow for expansion, the blow-by would be so extreme that the engine would not run sufficiently to get up to temperature and create the proper seal. Thus, the expansion space is provided and the clearance gap is closed with piston rings as shown in FIGS. 1 and 2. There may be one piston ring, two piston rings, or more, depending on the engine design and the objectives thereof. Regardless of the number, each piston ring 10 is disposed in a ring groove 16 in the peripheral surface of the piston 14 adjacent to the top thereof. The piston ring 10 is not a complete circle. Rather, it is incomplete and has a gap 12 at its ends so that it can be compressed or expanded in diameter within the ring groove 16. Typically, a piston ring 10 operates by expanding so that its outer peripheral surface presses against the cylinder wall to seal the expansion space between the piston 14. This expansion is caused by the high pressure gases formed in the cylinder above the piston 14. These gases flow down the between the piston and cylinder wall. These high pressure gases first force the piston ring 10 downward in the piston ring groove 16. The gases then enter the ring groove 16 from a point above the piston ring 10, and eventually flow behind the piston ring where they force it outwards to seal the expansion space. The piston ring 10 is hence exposed to frictional forces due to its movement within the ring groove 16 and up and down within the cylinder, which decrease the life of the ring due to friction-induced wear. Hardness and lubricity of the rings are hence a desirable quality. Hardness limits the amount of wear, such as scoring, due to friction. Lubricity between the parts is essential to provide proper operation of the piston/cylinders and to prevent seizure of these components and also reduce friction between the piston, piston ring and cylinder components.

Early low compression engines with piston rings made of the materials available at the time tended to form carbon within the ring grooves over time. Recent engine designs and the materials employed for the pistons, cylinders, and rings as well as the modern more accurately computer-controlled engines have resulted in less tendency for there to be formation of carbon in the ring grooves which caused the piston ring to stick within the piston groove.

While engine designs and materials have certainly improved over the years, there still remain deficiencies such as lower than desirable fuel efficiency and higher than desirable pollution emissions. In a co-pending application entitled HIGH-EFFICIENCY, LOW-POLLUTION ENGINE by the inventors of this application and assigned to the common assignee, an improved fiber reinforced ceramic matrix composite (FRCMC) material is disclosed having high breakage resistance and particular applicability to use for parts in a high temperature internal combustion engine. This copending application was filed on Aug. 16, 1995 and assigned Ser. No. 08/515,604. The disclosure of the co-pending application is incorporated by reference. The co-pending application taught FRCMC pistons and cylinders. Being of the FRCMC material, the pistons and cylinders can withstand much higher operating temperatures than conventional internal combustion engines. Operation at higher temperatures increases fuel efficiency and reduces the pollution produced because fuel and contaminants are more completely burned at higher temperatures. Moreover, since the coefficient of thermal expansion of the parts is much lower, decreasing the allowance required for the dissimilar thermal expansion of the components, much closer tolerances can be maintained without the danger of engine seizure. Still, however, to operate at as high a compression ratio as possible without efficiency-robbing blow-by, there must be piston rings. Conventional piston rings are not adequate, however. Despite the many improvements in materials and wear resistance, prior art piston rings are intended for use in metal engines. The FRCMC material of the pistons and cylinders, in conjunction with its ceramic wear coatings will quickly erode even the hardest conventional metallic piston rings.

To prevent the common piston ring problems, car, motorcycle, truck, train, and other machinery applications could utilize a better piston ring than is provided by current technology, especially those employing FRCMC pistons and/or cylinders. Depending on the application, this improved piston ring should be constructed of material that is light, long wearing, and which has a low thermal expansion so as to allow manufacture of the engine parts to close tolerances. This ensures a longer life and improved performance over the present technology. Additionally, this improved piston ring should be hard to endure the stresses of piston/cylinder operation and be tolerant of high temperatures to which they will be exposed as a result of the combustion within the cylinders and the friction of the interfacing parts. It should also be made of material that has a low coefficient of friction so as to reduce the wear due to the friction of the various piston components rubbing together during piston/cylinder operation.

Wherefore, it is an object of this invention to provide a lightweight, but high strength piston ring which is ductile and fracture resistant.

It is another object of the present invention to provide a piston ring that can be used in a FRCMC cylinder or in combination with a FRCMC piston without rapid erosion.

It is still another object of this invention to provide a piston ring that has a lower thermal expansion, so as to allow engine parts to be machined to much closer tolerances without the danger of engine seizure.

It is still another object of this invention to provide a piston ring that exhibits high hardness and good lubricity at elevated temperatures.

Wherefore, it is another object of the present invention to provide a piston ring which is capable of withstanding high temperatures and thermally-induced strains.

Other objects and benefits of this invention will become apparent from the description which follows hereinafter when read in conjunction with the draw figures which accompany it.

SUMMARY

The foregoing objects have been achieved by a strong, ductile and erosion resistant/fracture-resistant piston ring, which is light weight and capable of withstanding high temperatures and thermally-induced strains. The piston ring is made of a fiber reinforced ceramic matrix composite (FRCMC) material. This piston ring made of this FRCMC material also exhibits a high degree of hardness and provides good lubricity, even at elevated temperatures, when tailored by incorporating certain filler materials. The FRCMC material includes a polymer-derived ceramic resin in its ceramic state and fibers. The ceramic portion of the material for the most part provides the heat-resistant capabilities of the FRCMC material, while the fibers produce a desired degree of ductility in the FRCMC material. Ductility for the purposes of the present invention is defined as the amount strain a sample of the FRCMC material can withstand before fracturing or tearing. The piston ring has a C-shaped body structure.

Forming a piston ring of FRCMC material has significant advantages over the prior cast iron or steel piston rings, or piston rings made of other materials. First, FRCMC material can be formed into practically any shape and size desired. FRCMC material being somewhat ductile makes the piston rings fracture resistant and capable of withstanding mechanically-induced strains associated with its expansion to install it into the ring groove of a piston and the thermally-induced strains which may be imparted to the ring when the internal combustion engine is operating. Additionally, the FRCMC material, especially if comprised of a woven fiber, is very strong for a given weight. Since the FRCMC piston rings are thermally stable, that is, have a low coefficient of thermal expansion even at high temperatures, the rings and other adjacent parts can be manufactured to much closer tolerances without the danger of engine seizure. Additionally, the FRCMC material has a high degree of hardness and a low coefficient of friction when appropriate filler materials are utilized, which is maintained even at high temperatures. This reduces the wear of the piston ring and the cylinder.

The pre-ceramic resin used to form the FRCMC material can be any commercially available polymer-derived ceramic precursor resin, such as silicon-carboxyl resin or alumina silicate resin, and the fibers are preferably at least one of alumina, Nextel 312, Nextel 440, Nextel 510, Nextel 550, silicon nitride, silicon carbide, HPZ, graphite, carbon, and peat. The aforementioned degree of ductility caused by the fibers varies with the percentage by volume of the fibers in the FRCMC material. Preferably, there is a sufficient quantity of fibers to produce the desired degree of ductility. Specifically, the percentage by volume of the FRCMC material consisting of the fibers is within a range of about 35 to 70 percent, which will produce a degree of ductility between about 0.4 and 0.6 percent strain to failure. In addition, the form of the fibers incorporated into the FRCMC material has a continuous configuration that also contributes to the degree of ductility exhibited. The fibers are also preferably coated with an interface material that increases the ductility exhibited by the FRCMC material so as to facilitate producing the desire degree of ductility. Specifically, the interface material preferably includes at least one 0.1–0.5 micron thick layer of at least one of carbon, silicon nitride, silicon carbide, silicon carboxide, or boron nitride. The FRCMC material can also further incorporate a filler material which increases the hardness of the material. Specifically, the filler material can include one or more of the following: carbon, alumina, silicon carbide, silicon nitride, boron nitride, tungsten carbide, titanium dioxide, chrome carbide and chrome dioxide. The degree of hardness provided by the filler material varies with the percentage by volume of the structure consisting of the filler material. Accordingly, a sufficient quantity of filler material should be incorporated to produce the desired degree of hardness. To decrease the coefficient of friction of the piston ring, filler materials such silicon nitride and/or boron nitride can be incorporated. Thus, the addition of silicon nitride and/or boron nitride can both increase hardness and decrease the coefficient of friction.

The piston ring of the present invention is preferably formed by employing continuous woven fiber rope to achieve a high degree of ductility for a given weight. The preferred embodiment includes a ceramic C-shaped body comprised of FRCMC material having a fiber rope which produces radial ductility when this fiber rope is placed circumferentially around the piston ring. The fiber orientation is in the direction of the loading. This preferred embodiment is preferably made using a resin transfer molding (RTM) process in conjunction with a fiber rope preform to enhance ductility and ceramic, metallic or organic fillers to enhance hardness and lower the coefficient of friction.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 1 is a simplified side view of a prior art metal piston ring.

FIG. 2 is a cutaway view though one side of the piston ring of FIG. 1.

FIG. 3 is a simplified side view of a piston ring according to the present invention.

FIG. 4 is a cutaway view through one side of the piston ring of FIG. 3.

FIG. 5 is a cutaway view of a piston ring having a cross-section with a tapered wall.

FIG.6 is a cutaway view of a piston ring having a cross-section which includes a beveled corner.

FIG. 7 is a cutaway view of a piston ring having a keystone shaped cros-section.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention. The structure of the piston ring; the materials of which the piston ring may be made; tailoring specifics and methods of making the preferred embodiment of the piston ring will be discussed in turn in the following paragraphs.
Structure FIG. 3 depicts an embodiment of a piston ring 20 in accordance with the present invention. In this embodiment, the piston ring of the invention consists of a C-shaped body fabricated of FRCMC material. The piston ring 20 has generally circular body shape. However, the piston ring 20 has a gap 22 in the body. FIG. 4 shows a section along line 4—4 of FIG. 3. The piston ring 20 is disposed within a groove 26 in the piston head 14. One of more rings 20 may be employed within a given piston head.

It should be noted that the piston ring can have various cross-sectional shapes as shown, for example, in FIGS. 5, 6 and 7. FIG. 4 shows a piston ring 30 cross-section that has a tapered wall 32. This type of ring wall 32 is often tapered approximately one degree. This provides initially a line contact with the cylinder wall (not shown), which because of high unit pressure quickly seats, assuring improved sealing against compression losses. FIG. 5 shows a piston ring 40 which has a cross-section with a beveled inside upper corner 42. This form of piston ring cross-section utilizes gas pressure to cause the bottom edge of the ring to contact the cylinder wall (not shown) with high pressures. This helps to seal against compression losses. FIG. 6 shows a piston ring 50 which has a key-stone cross-sectional area. Several advantages exist to this keystone form of the piston ring. Because of its wedge or keystone shape, the forces of compression cause a certain degree of motion between the ring and the piston. The action is claimed to free the ring of carbon accumulation, thereby preventing sticking of the ring in the groove. However, the recitation of these specific shapes of piston rings is not meant to limit the present invention. In general, any type of piston ring can be formed of the FRCMC material because it lends itself to be easily formable into even the most complex shapes.
Materials Materials appropriate for use in forming FRCMC piston rings generally are made by combining any commercially available polymer-derived ceramic precursor resin, such as silicon-carboxyl resin or alumina silicate resin, with some type of fibers. Examples of appropriate ceramic precursor resins include BLACKGLAS™ sold by Allied Signal, CERASET™ sold by the Lanxide Corporation, SYLRAMIC™ sold by Dow Chemical, STARFIRE™ sold by the Starfire Corporation, and TONEN™ sold by the Tonen Corporation. An example of an appropriate alumina silicate pre-ceramic resin is CO-2 sold by Applied Polymerics. Examples of types of fibers which might be employed in an FRCMC material include alumina, Nextel 312, Nextel 440, Nextel 510, Nextel 550, silicon nitride, silicon carbide, HPZ, graphite, carbon, and peat. To add toughness to the material, the fibers being incorporated into the FRCMC layers are preferably first coated with an interface material such as carbon, silicon nitride, silicon carbide, silicon carboxide, boron nitride or multiple layers of one or more of these interfacial materials. The interface material prevents the resin from adhering directly to the fibers of the fiber system. Thus, after the resin has been converted to a ceramic, there is a weak interface between the ceramic matrix and the fibers. This weak bond enhances the ductility exhibited by the FRCMC material. In addition, the FRCMC material can include filler materials preferably in the form of powders having particle sizes somewhere between about 1 and 60 microns. These filler materials are used to increase the hardness and the lubricity of the FRCMC material as appropriate for a piston ring. The resin, fiber, and possibly filler material mixture is generally formed into the shape of the desired structure via one of a variety of methods and heated for a time to a temperature, as specified by the material suppliers (typically between 1,500° F. and 2,000° F.), which causes the resin to be converted into a ceramic.
Tailoring for Specific Properties The fibers and interface materials incorporated into the FRCMC material provide the ductility and so impart strength to the material. Ductility is the measure of how much strain the structure can withstand before fracturing or tearing. This ductility gives the FRCMC material the strength to withstand the rigors of ring installation, frictional forces, high pressures and thermally-induced strains associated with a widely varying temperature environment. The tailoring process is a subject of a co-pending application entitled POLYMER-DERIVED FIBER REINFORCED CERAMIC MATRIX COMPOSITE MATERIALS HAVING TAILORED DUCTILITY, HARDNESS AND COEFFICIENT OF FRICTION CHARACTERISTICS, having the same inventors as the present application and assigned to a common assignee. This co-pending application was filed on Oct. 14, 1998 and assigned Ser. No. 09/172,361. The disclosures of the co-pending application are incorporated by reference. Generally, a piston ring made of FRCMC material will be thermally stable; that is, it will have a low coefficient of expansion even at high temperatures. Other characteristics of the FRCMC material can also be of interest in the design of the piston ring according to the present invention, such as the hardness and coefficient of friction of the material. The harness and coefficient of friction of the FRCMC material can controlled to some extent by the addition of certain filler material to the composite.

The above-described tailoring involves incorporating the appropriate type of fibers into the composite in sufficient quantities to produce a desired degree of ductility. Additionally, the tailoring can involve incorporating the filler material into the composite in sufficient quantities to produce a desired degree of hardness and/or coefficient of friction. In both cases, the degree to which these respective characteristics are exhibited varies with the type and percent by volume of fibers and filler materials incorporated into the structure.

The ductility exhibited by a FRCMC material can also be tailored by selecting the form of the fibers. Namely, selecting a continuous or woven fiber system where the individual fibers typically run the entire length of the FRCMC structure. This continuous fiber reinforced form would provide high strength for a given weight. For the preferred embodiment of this invention a woven continuous fiber rope is employed to form the C-shaped piston ring. Finally, it is noted that the choice of interface material can have an effect on the degree of ductility exhibited by the FRCMC material. In this case it is preferred boron nitride be used as the interface material. By way of an example, it is noted that a piston ring employing a woven continuous fiber rope constituting about 50 percent by volume of the FRCMC structure and a boron nitride interface material coating on the fibers, will exhibit a ductility of approximately 0.6 percent strain to failure.

Tailoring the hardness and coefficient of friction of the FRCMC material involves the addition of an appropriate filler material, as mentioned previously. Specifically, hardness can be varied by incorporating at least one of alumina, silicon carbide, silicon nitride, tungsten carbide, titanium dioxide, chrome carbide or chrome dioxide as the filler material. Additionally, the coefficient of friction can be lowered by incorporation of at least one of carbon, silicon nitride or boron nitride. However, both the hardness can be increased and the coefficient of friction decreased by the substance(s) if silicon nitride and/or boron nitride are employed as the filler material. In any case, it is preferred that the filler material be incorporated in sufficient quantities to make up about 25 percent of the volume of the FRCMC material making up the piston ring, or at least the portion of the FRCMC material disposed on the outside of the aforementioned rope.

Method of Manufacture

The piston rings of the present invention can be fabricated by using various methods. One preferred method is resin transfer molding (RTM). The RTM process is described in a co-pending application entitled METHODS AND APPARATUS FOR MAKING CERAMIC MATRIX COMPOSITE LINED AUTOMOBILE PARTS AND FIBER REINFORCED CERAMIC MATRIX COMPOSITE AUTOMOBILE PARTS by the inventors herein and assigned to the common assignee of the present application. This co-pending application was filed on Aug. 16, 1995 and assigned Ser. No. 08/515,849. The disclosure of this co-pending application is incorporated by reference. The RTM method described in the co-pending application generally involves forming a preform in the shape of the part from the aforementioned fibers, which in this case constitutes a continuous, woven fiber rope; placing the preform in a cavity of a mold having the shape of the piston rings; forcing a liquid pre-ceramic polymer resin through the cavity to fill the cavity and saturate the preform; heating the mold at a temperature and for a time associated with the pre-ceramic polymer resin which transforms the liquid pre-ceramic polymer resin-saturated preform into a polymer composite part; removing the polymer composite part from the mold; and, firing the polymer composite part in a controlled atmosphere at a temperature and for a time associated with the pre-ceramic polymer which transforms it into a ceramic, whereby the polymer composite part is transformed into a fiber reinforced ceramic matrix composite piston rings. If filler materials are to be incorporated to increase hardness and/or to lower the coefficient of friction they would be mixed with the liquid pre-ceramic resin before forcing it through the cavity of the mold. It should be noted that the filler materials will not readily enter into the weave of the woven fiber rope structure and so most of the filler material particles will be concentrated in that part of the FRCMC material covering the outside of the fiber rope, where they are most needed.

The woven fiber preform in the form of a fiber rope is placed in the mold prior to assembling the mold. In addition, the inlet to the sprue channels of the mold is connected to a reservoir containing pre-ceramic resin. The outlet associated with the resin outlet ports of the mold is connected to a vacuum source. With the preform in place, the vacuum source is activated for creating a vacuum and the path to the resin reservoir is opened. Resin under pressure is forced into the mold and through the preform from the combined pressure and the vacuum from the vacuum source until the preform is totally saturated with the resin.

An alternate preferred method of manufacturing the piston ring in accordance with the present invention is via a compression molding process. This process is described in a co-pending application entitled COMPRESSION/INJECTION MOLDING OF POLYMER-DERIVED FIBER REINFORCED CERAMIC MATRIX COMPOSITE MATERIALS having the same inventors as the present application and assigned to a common assignee. This co-pending application was filed on Aug. 28, 1996 and assigned Ser. No. 08/704,348. The disclosure of this co-pending application is herein incorporated by reference. The following simplified process provides an example of using the aforementioned compression molding process to form a FRCMC piston ring:

(a) First, the fibers of the woven fiber rope as described previously are coated via well known methods with the aforementioned interface material. In this case, one 0.1 to 0.5 micron thick layer of boron nitride was chosen as the interface material. Once coated, the fiber rope is saturated with pre-ceramic resin, which in the case of this example is BLACKGLAS resin. The rope is saturated with resin for two reasons. First, as the fibers are tightly packed in the fiber rope, saturating them prior to molding ensures the resin is uniform throughout. If the fiber rope where place in the mold dry, there is a risk that resin pushed through the fibers during molding would not reach all areas. These dry area could undesirably weaken the structure.

(b) A second reason the fiber rope is saturated with resin is to facilitate coating the outside of the rope with filler materials. Once the fiber rope is saturated with resin, it is coated with a filler material(s) which will impart the desired hardness and coefficient of friction to the surface of the stem. This coating can be accomplish via any appropriate conventional method, such as rolling the saturated fiber rope in the filler material or tumbling the rope with the filler material.

(c) The coated resin-saturated fiber rope is then placed into the portion of a female mold die. The interior female mold die has a shape which in combination with a male mold die forms a cavity therebetween having the desired shape of the piston ring.

(d) Next, the male mold die is lowered and the mold compressed to form the piston ring. As the fiber rope is compressed, excess resin is ejected from the mold through one or more resin outlet ports. The filler material coating the exterior of the fiber rope will stay in place for the most part and mix with some of the resin during the compression process, thereby forming an external layer which will exhibit the desired hardness and coefficient of friction.

(e) The mold is then heated at a temperature and for a time associated with the pre-ceramic resin which polymerizes the resin to form a fiber-reinforced polymer composite structure.

(f) Next, the polymerized composite structure is removed from the mold.

(g) And finally, the polymerized composite structure is fired at a temperature and for a time associated with the polymerized resin which pyrolizes it to form a FRCMC structure.

Once the FRCMC piston ring is molded via the compression molding process, it is preferred that an additional procedure be performed to eliminate pores created during the required heating cycles. Eliminating these pores strengthens the part. Specifically, after the completion of the heating step which pyrolizes the FRCMC piston ring, the part is immersed into a bath of a pre-ceramic resin to fill the pores. The part is then heated at a temperature and for a time associated with the resin filling the pores so as to transform it into a ceramic material. Unfortunately, the process of heating the resin filling the pores will create further pores. Accordingly, it is desired that the filling and heating steps be repeated until the pore density within the FRCMC piston ring is less than a prescribed percentage by volume. This prescribed percentage corresponds to the point where the part will exhibit a repeatable strength from one part to the next. To facilitate the filling step, it is preferred that the resin has a water-like viscosity. In addition, the FRCMC part could be placed in a vacuum environment to assist in the filling of the pores.

The piston ring components can also be fabricated using other well known methods applicable to FRCMC part formation including hot pressing, tape or tow placement, or hand lay-up. It is not intended to limit the invention to any of the described methods. Rather any appropriate method may be employed to form the piston rings components from the previously described FRCMC material.

Because it has qualities that conventional piston ring components do not have such as heat and fracture-resistance under extreme temperatures, light weight, and high strength, the piston rings components made from above-described FRCMC material have several advantages. The FRCMC piston rings are stronger than presently used piston rings, and thereby increase the life of the ring. Additionally, the FRCMC piston rings exhibit a lower thermal expansion and thus can be manufactured to closer tolerances. If the piston rings are tailored using filler materials to increase hardness and lower coefficient of friction, then the piston rings will exhibit greater hardness and lubricity over the present art.

While the invention has been described in detail by specific reference to preferred embodiments thereof, it is understood that variations and modifications thereof may be made without departing from the true spirit and scope of the invention. For example, while a piston ring is being described for purposes of an example of this disclosure, the present invention would also be applicable to make the rotor seals of, for example, a FRCMC rotary engine. Additionally, some conventional piston rings employ a groove around the exterior circumference of the ring which is filled with various materials to increase the life of the piston ring. Such piston ring could be similarly formed such that the FRCMC material is disposed only in the exterior, circumferential groove. Alternately, only the ring could be made of FRCMC material and the groove could be made of other material. Additionally, FRCMC materials could also be used to manufacture oil rings which are designed to control the amount of oil on the cylinder walls so that there is enough for lubrication, but not such an excess it would reach the combustion chamber. In fact, the FRCMC material could conceivably be used to form any of the prior art piston rings, or be employed for any device that is used to seal against compressed air losses.

Wherefore, having thus described the present invention, what is claimed is:

1. A heat-resistant, thermally stable, ductile piston ring for an internal combustion engine, comprising:
    a generally C-shaped body comprised at least partially of fiber reinforced ceramic matrix composite (FRCMC) material comprising a polymer-derived ceramic resin in the ceramic state of said resin and fibers, said fibers being incorporated in the form of a fiber rope and present in an amount from 35–70 percent by volume of said (FRCMC), said generally C-shaped body having a cross-sectional shape selected from the group consisting of rectangular, keystone, trapezoidal, and rectangular wherein a respective corner of said rectangle is beveled.

2. The piston ring of claim 1 wherein the polymer-derived ceramic resin is chosen from silicon-carboxyl resin or alumina silicate resin.

3. The piston ring of claim 1 wherein the fibers comprise at least one of alumina, Nextel 312, Nextel 440, Nextel 510, Nextel 550, silicon nitride, silicon carbide, HPZ, graphite, carbon, and peat.

4. The piston ring of claim 1, wherein the form of the fibers incorporated into the FRCMC material has a continuous configuration, said fibers being incorporated into the FRCMC in an amount sufficient to produce a ductility of 0.6 percent strain to failure or less.

5. The piston ring of claim 1, wherein the fibers are coated with an interface material which increases the degree of ductility exhibited by the FRCMC material.

6. The piston ring of claim 5 wherein the interface material comprises at least one 0.1–0.5 micron thick layer of at least one of carbon, silicon nitride, silicon carbide, silicon carboxide, or boron nitride.

7. The piston ring of claim 1, wherein the FRCMC material further comprises a filler material which increases the hardness of the material.

8. The piston ring of claim 7, wherein the filler material comprises at least one of alumina, silicon carbide, silicon nitride, boron nitride, tungsten carbide, titanium dioxide, chrome carbide or chrome dioxide.

9. The piston ring of claim 7, wherein the degree of hardness provided by the filler material varies with the percentage by volume of the structure consisting of the filler material, and wherein there is a sufficient quantity of filler material to produce a desired degree of hardness.

10. The piston ring of claim 9, wherein the percentage by volume of the FRCMC material consisting of the filler material is about 25 percent.

11. The piston ring of claim 1, wherein the FRCMC material further comprises a filler material which lowers the coefficient of friction of the material.

12. The piston ring of claim 11, wherein the filler material comprises at least one of carbon, silicon nitride or boron nitride.

13. The piston ring of claim 1, wherein the percentage by volume of the FRCMC material consisting of the filler material is about 25 percent.

14. The piston ring of claim 1 wherein said structure comprises a C-shape.

15. A method for forming a generally C-shaped heat-resistant, thermally stable, ductile piston ring, comprising the step of:

forming a structure comprised of fiber reinforced ceramic matrix composite (FRCMC) material comprising a polymer-derived ceramic resin in its ceramic state, formed as a fiber rope present in an amount between 35–70 percent volume of said (FRCMC) fibers, and a filler material present in an amount of no greater than 25 percent of the volume of said (FRCMC) such that at least one of (i) increased the hardness of the outer surface of the piston ring, and (ii) decreases the coefficient of friction of the outer surface of the piston ring, said generally C-shaped structure further being formed to have a cross-sectional shape selected from the group consisting of rectangular, keystone, trapezoidal, and rectangular wherein a respective corner of said rectangle is beveled.

16. A heat-resistant, thermally stable, ductile piston ring for an internal combustion engine, comprising:

a generally C-shaped body comprised at least partially of fiber-reinforced ceramic matrix composite (FRCMC) material comprising a polymer-derived ceramic resin wherein said resin exists in its ceramic state having a multiplicity of fibers therein, said fibers being formed as a rope and present in an amount between 35–70 percent volume of said (FRCMC) such that said generally C-shaped body has a ductility of 0.6 percent strain to failure or less.

17. The piston ring of claim 14 wherein said generally C-shaped body is formed to have a ductility ranging between 0.40 to 0.6 percent strain to failure.

* * * * *